United States Patent
Higashi

(10) Patent No.: US 10,955,972 B2
(45) Date of Patent: Mar. 23, 2021

(54) DETECTION DEVICE AND METHOD FOR CONTROLLING DETECTION DEVICE

(71) Applicant: SEIKO EPSON CORPORATION, Tokyo (JP)

(72) Inventor: Keisuke Higashi, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 28 days.

(21) Appl. No.: 16/364,404

(22) Filed: Mar. 26, 2019

(65) Prior Publication Data
US 2019/0302965 A1 Oct. 3, 2019

(30) Foreign Application Priority Data
Mar. 27, 2018 (JP) .............................. JP2018-059591

(51) Int. Cl.
*G06F 3/042* (2006.01)
*G06F 3/038* (2013.01)
*G06F 3/0354* (2013.01)

(52) U.S. Cl.
CPC ............ *G06F 3/0425* (2013.01); *G06F 3/038* (2013.01); *G06F 3/03542* (2013.01)

(58) Field of Classification Search
CPC ..... G06F 3/0425; G06F 3/038; G06F 3/03542
See application file for complete search history.

(56) References Cited

U.S. PATENT DOCUMENTS

| | | | | |
|---|---|---|---|---|
| 8,659,582 B2* | 2/2014 | Kiyose | .................. | G06F 3/0304 345/175 |
| 9,057,477 B2* | 6/2015 | Kiyose | .................. | G06F 3/0418 |
| 10,015,457 B2* | 7/2018 | Uchiyama | ............ | H04N 9/3179 |
| 10,140,080 B2* | 11/2018 | Suzuki | .................. | G06F 3/1438 |
| 2015/0324054 A1* | 11/2015 | Kobayashi | ............ | G06F 3/0425 345/175 |
| 2016/0202843 A1* | 7/2016 | Suggs | .................. | G06T 11/001 345/175 |
| 2017/0237955 A1* | 8/2017 | Koyama | ............... | G06F 3/0416 348/745 |
| 2019/0095043 A1* | 3/2019 | Higashi | ................. | G06F 3/0386 |
| 2019/0302594 A1* | 10/2019 | Higashi | ................ | H04N 9/3179 |
| 2019/0302965 A1* | 10/2019 | Higashi | ................ | G06F 3/0425 |

FOREIGN PATENT DOCUMENTS

JP 2016-186677 A 10/2016

OTHER PUBLICATIONS

Machine Translation of JP2016186677A (Year: 2016).*

* cited by examiner

*Primary Examiner* — Patrick N Edouard
*Assistant Examiner* — Joseph P Fox
(74) *Attorney, Agent, or Firm* — Oliff PLC

(57) ABSTRACT

A projector includes: a first camera which receives light emitted from a self-light-emitting pointing element; a position detection unit which detects an operation of the self-light-emitting pointing element to a detection area, based on a light reception state of the first camera; and a light emission control unit which calculates a light emission intensity of the self-light-emitting pointing element, based on distance information from an end part of the detection area to the first camera.

14 Claims, 7 Drawing Sheets

DETECTION DEVICE AND METHOD FOR CONTROLLING DETECTION DEVICE

BACKGROUND

1. Technical Field

The present invention relates to a detection device and a method for controlling a detection device.

2. Related Art

According to the related art, a system for detecting a position of a pointing element emitting light is known (see, for example, JP-A-2016-186677). The system disclosed in JP-A-2016-186677 detects light emitted by a self-light-emitting pointing element, from an image picked up by an image pickup unit. In the system disclosed in JP-A-2016-186677, in order to restrain power consumption due to light emission of the self-light-emitting pointing element, the amount of light emitted from the self-light-emitting pointing element is adjusted, based on the received light intensity of signal light transmitted from a projector to the self-light-emitting pointing element.

In the related-art configuration, the amount of light emitted from the self-light-emitting pointing element is adjusted by the self-light-emitting pointing element itself, based on the intensity of signal light received by the self-light-emitting pointing element. This technique is not an adjustment based on the intensity of light for detection that is actually emitted by the self-light-emitting pointing element. Therefore, there is room for improvement to optimize the light emission intensity for the self-light-emitting pointing element and for the projector.

SUMMARY

An advantage of some aspects of the invention is that, in a configuration to detect light emitted from a detection target device, the light emission intensity of the detection target device is optimized for the detection target device and for a detection device and thus can be adjusted based on a condition closer to the actual detection.

A detection device according to an aspect of the invention includes: a light receiving unit which receives light emitted from a detection target device; a detection unit which detects an operation of the detection target device to a detection area, based on a light reception state of the light receiving unit; and a light emission control unit which calculates a light emission intensity of the detection target device, based on distance information from an end part of the detection area to the light receiving unit.

In this configuration, the light emission intensity of light emitted from the detection target device is calculated, based on the distance from the end of the detection area to the light receiving unit of the detection device. Therefore, a light emission intensity that is necessary to receive and detect light emitted from the detection target device can be accurately calculated. Thus, the light emission intensity of the detection target device can be properly adjusted, based on a condition close to the actual detection.

The aspect of the invention may be configured such that the detection device further includes a display unit which displays an image on a display surface, the light receiving unit is an image pickup unit which picks up an image over a range including the detection area that is set on the display surface, and the detection unit detects an operation of the detection target device to the detection area, based on a picked-up image by the image pickup unit.

According to this configuration, a proper light emission intensity of the detection target device can be found in the case of detecting light emitted from the detection target device in the detection area that is set on the display surface.

The aspect of the invention may be configured such that, when a position pointing operation using the detection target device is carried out in the detection area, the detection unit detects a pointed position in the detection area, based on the picked-up image by the image pickup unit.

According to this configuration, a proper light emission intensity of the detection target device can be found in the case of detecting a pointed position of the detection target device in the detection area, based on the picked-up image.

The aspect of the invention may be configured such that the detection device further includes a display control unit which controls the display unit, and when the display control unit sets an image display area in apart of the display surface and causes the image to be displayed, the detection unit detects an operation of the detection target device to the image display area.

According to this configuration, a proper light emission intensity of the detection target device can be found when the detection device displaying an image on the display surface detects light emitted from the detection target device in the detection area that is set on the display surface.

The aspect of the invention may be configured such that, the light emission control unit calculates the light emission intensity of the detection target device, based on a distance between a most distant position from the image pickup unit in the image display area and the image pickup unit.

According to this configuration, a light emission intensity of the detection target device that is necessary to detect a pointed position of the detection target device in the detection area based on the picked-up image can be accurately found.

The aspect of the invention may be configured such that the detection device further includes a setting unit which sets a light emission intensity of the detection target device onto the detection target device, based on the light emission intensity of the detection target device calculated by the light emission control unit.

According to this configuration, a proper light emission intensity of the detection target device can be set in the case of receiving and detecting light from the detection target device.

The aspect of the invention may be configured such that the detection device further includes a transmission unit which transmits a signal to the detection target device, and the setting unit causes the transmission unit to transmit control information for setting a light emission intensity of the detection target device, to the detection target device.

According to this configuration, the control information can be transmitted to the detection target device, thus setting a proper light emission intensity of the detection target device.

A method for controlling a detection device including a light receiving unit which receives light emitted from a detection target device according to another aspect of the invention includes: detecting an operation of the detection target device to a detection area, based on a light reception state of the light receiving unit; and calculating a light emission intensity of the detection target device, based on distance information from an end part of the detection area to the light receiving unit.

In this configuration, the light emission intensity of light emitted from the detection target device is calculated, based on the distance from the end of the detection area to the light receiving unit of the detection device. Therefore, a light emission intensity that is necessary to receive and detect light emitted from the detection target device can be accurately calculated. Thus, the light emission intensity of the detection target device can be properly adjusted, based on a condition close to the actual detection.

The invention can also be implemented in various other forms than the detection device and the method for controlling the detection device. For example, the invention may be implemented as a program executed by a computer (or processor) to execute the method. The invention can also be implemented as a recording medium having the program recorded thereon, a server device which distributes the program, a transmission medium which transmits the program, a data signal which embodies the program in a carrier wave, or the like.

BRIEF DESCRIPTION OF THE DRAWINGS

The invention will be described with reference to the accompanying drawings, wherein like numbers reference like elements.

DESCRIPTION OF EXEMPLARY EMBODIMENTS

Outline of Detection System

Figure 1:
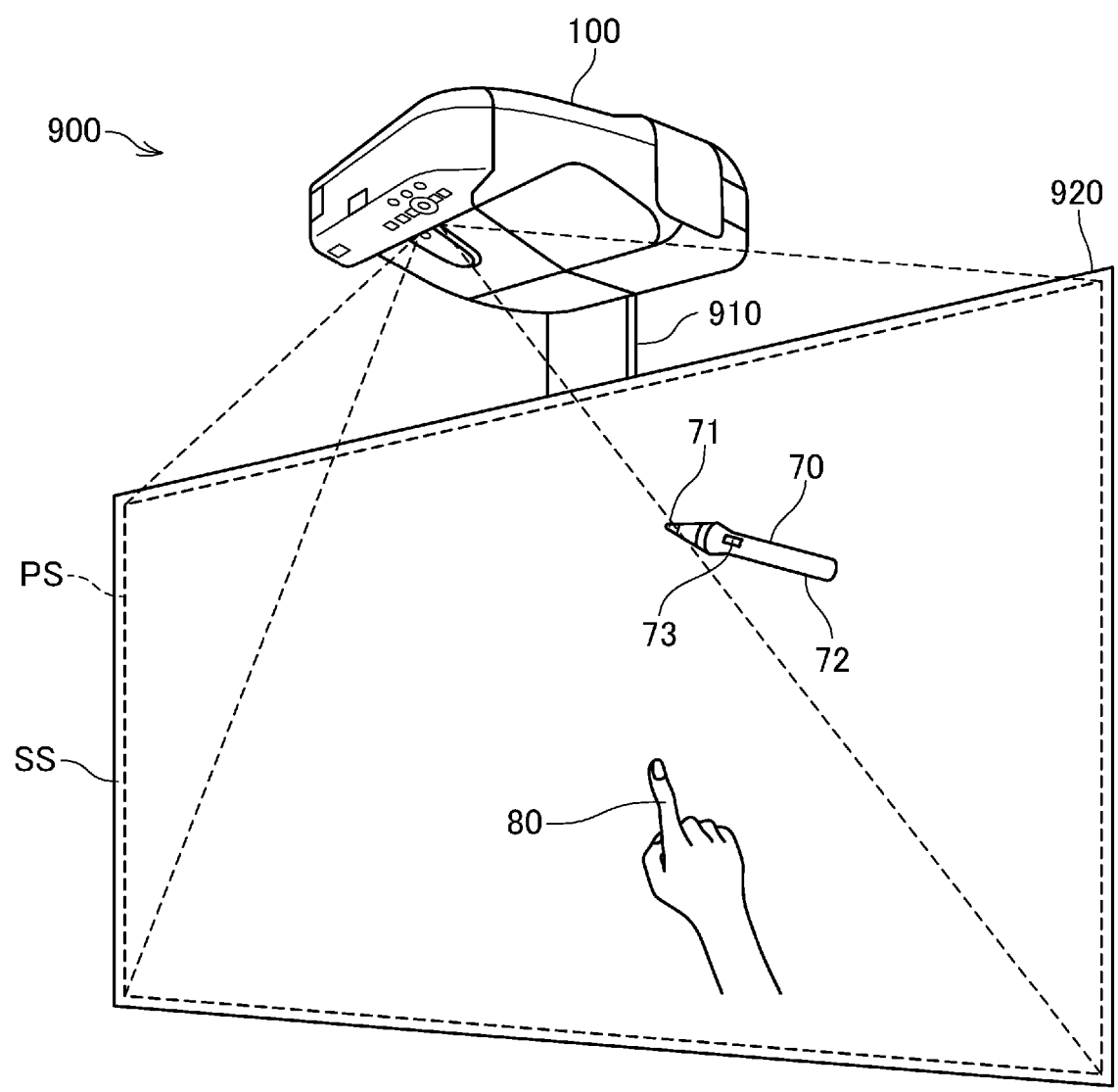
FIG. 1 shows a schematic configuration of a detection system.

FIG. 1 is a perspective view of a detection system 900 (projection system) according to an embodiment of the invention. The detection system 900 has a projector 100 (detection device) and a self-light-emitting pointing element 70 (detection target device). In the detection system 900, a non-light-emitting pointing element 80 can be used in combination with the projector 100. The projector 100 projects image light onto a display surface and also functions as a detection device which detects a pointed position of the self-light-emitting pointing element 70, which is the detection target device.

In the detection system 900, a screen board 920 is arranged at a position corresponding to the projector 100. The front side of the screen board 920 is used as a screen SS (display surface). The projector 100 is fixed at a position forward and upward from the screen board 920 by a support member 910. While the screen SS is vertically arranged in FIG. 1, the detection system 900 can be used where the screen SS is horizontally arranged. The screen SS may also be a curtain hanging on a wall surface or may be a surface of a piece of furniture. Also, a wall surface or a floor surface may be used as the screen SS. In this embodiment, the screen SS refers to a surface of a member where an image is projected.

The projector 100 projects image light onto the screen SS and thus forms a projection screen PS as a projection image on the screen SS. The projection screen PS refers to the area of an image projected on the screen SS by the projector 100. In the normal use of the projector 100, the projection screen PS is projected to fit within the screen SS.

The projection screen PS is an image projected, for example, based on image data stored in the projector 100 or generated by the projector 100. The projector 100 is an example of a display device. The operation of the projector 100 projecting the projection screen PS is an example of an operation of a display device displaying an image. If there is no image drawn inside the projector 100, light is cast onto the projection screen PS from the projector 100 and a white image is thus displayed.

The detection system 900 functions as a display system in which the projector 100 projects the projection screen PS onto the screen SS. In the detection system 900, a position pointing operation can be carried out on the screen SS via the self-light-emitting pointing element 70 and the non-light-emitting pointing element 80. The projector 100 detects the pointed position pointed by the self-light-emitting pointing element 70 and the non-light-emitting pointing element 80.

The self-light-emitting pointing element 70 is a pen-type pointing element having a distal end part 71 which can emit light, a shaft part 72 held by the user, and a button switch 73 provided on the shaft part 72. The configuration and functions of the self-light-emitting pointing element 70 will be described later.

The number of self-emitting pointing elements 70 that can be used in the detection system 900 may be one or a plurality and is not particularly limited. The same applies to the non-light-emitting pointing element 80. The non-light-emitting pointing element 80 is a pen which does not emit light, a finger of the user, or the like. In the description below, when the self-light-emitting pointing element 70 and the non-light-emitting pointing element 80 are not discriminated from each other, the pointing element in use is referred to simply as a pointing element 780.

Configuration of Detection System

Figure 2:
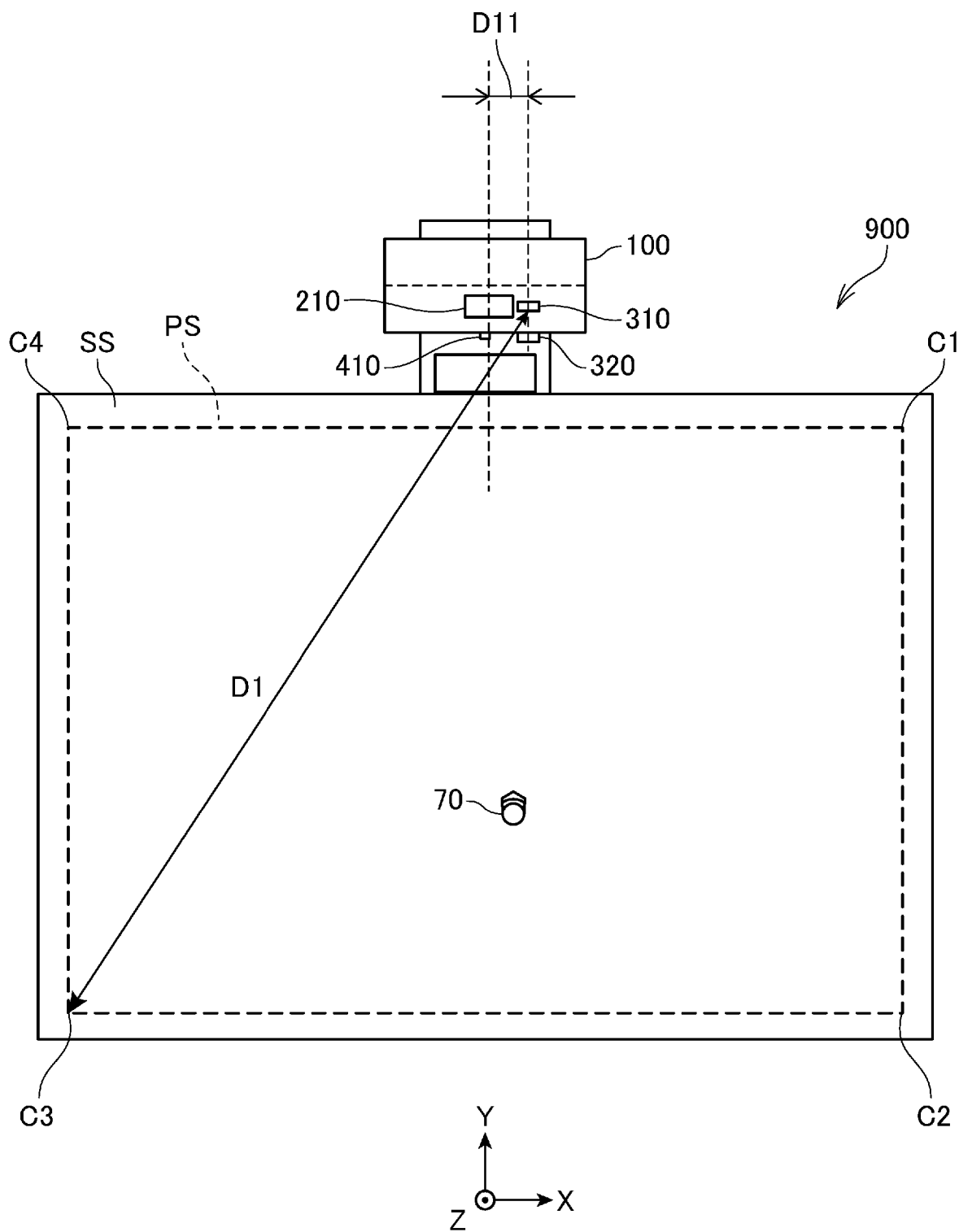
FIG. 2 is a front view of the detection system.
Figure 3:
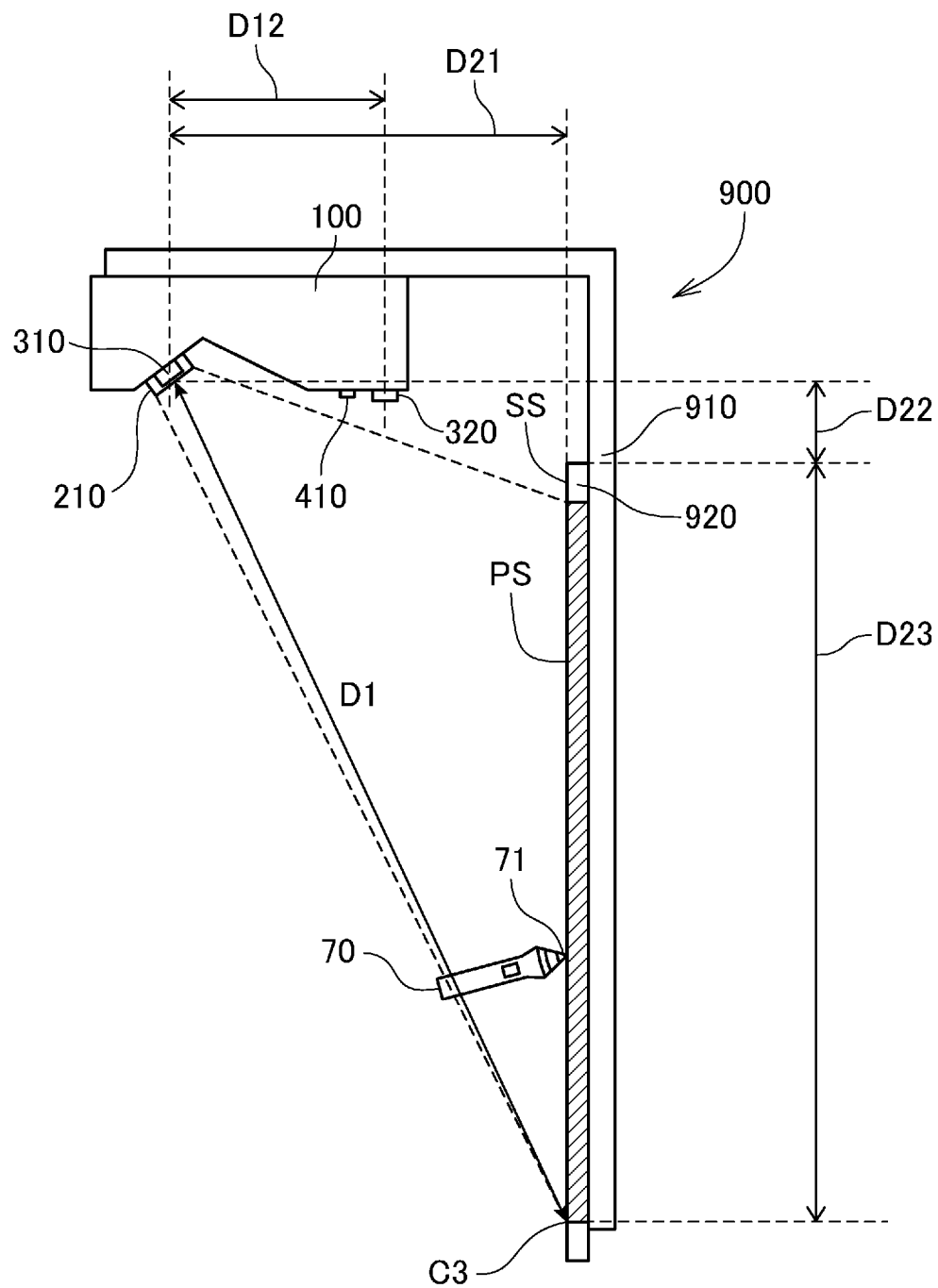
FIG. 3 is a side view of the detection system.

FIG. 2 is a front view of the detection system 900. FIG. 3 is a side view of the detection system 900. In the description below, a direction along the left-right side of the screen SS is defined as an X-direction. A direction along the up-down side of the screen SS is defined as a Y-direction. A direction along a normal line to the screen SS is defined as a Z-direction. For the sake of convenience, the X-direction is also referred to as a "left-right direction". The Y-direction is also referred to as an "up-down direction". The Z-direction is also referred to as a "front-rear direction". Of the Y-direction, the direction in which the projection screen PS is located as viewed from the projector 100 is referred to as a "downward direction". In FIG. 3, the range of the projection screen PS on the screen board 920 is hatched for the sake of convenience.

The projector 100 has a projection lens 210 which projects the projection screen PS onto the screen SS, a first camera 310 and a second camera 320 which pick up an image over the area of the projection screen PS, and a detection light irradiation unit 410 which casts detection light on the pointing element 780. In the description below, when the first camera 310 and the second camera 320 are collectively referred to, the term "cameras 310, 320" is used.

The angle of view of the first camera 310 and the second camera 320, that is, the image pickup range, is a range including at least the projection screen PS on the screen SS.

As the detection light cast from the detection light irradiation unit 410, for example, near-infrared light is used.

The cameras 310, 320 have at least a first image pickup function of picking up an image by receiving light in a wavelength range including the wavelength of the detection light emitted from the detection light irradiation unit 410. It is preferable that at least one of the cameras 310, 320 also has a second image pickup function of picking up an image by receiving light including visible light and can switch between these two image pickup functions. For example, it is preferable that each of the cameras 310, 320 has a near-infrared filter switching mechanism, not illustrated, that can place a near-infrared filter, which blocks visible light and only passes near-infrared light, in front of a lens or withdraw the near-infrared filter from in front of the lens. The cameras 310, 320 are arranged at the same position in the left-right direction (X-direction) and side by side at a predetermined distance from each other in the front-rear direction (Z-direction). The arrangement of the cameras 310, 320 is not limited to this embodiment. For example, the cameras 310, 320 may be arranged at the same position in the front-rear direction (Z-direction) and side by side at a predetermined distance from each other in the left-right direction (X-direction). The cameras 310, 320 may be arranged at different positions from each other in all of the X, Y, and Z-directions. Arranging the cameras 310, 320 at different positions from each other in the Z-direction (shifting the positions of the cameras from each other in the front-rear direction) is preferable because high accuracy on the Z-coordinate is achieved in calculating a three-dimensional position based on triangulation.

The projector 100 can detect a pointing operation of the self-light-emitting pointing element 70 or the non-light-emitting pointing element 80, specify a pointed position, and carry out an operation corresponding to the pointed position. For example, the projector 100 operates in a whiteboard mode. In the whiteboard mode, the user carries out an operation to draw a line or geometric figure by operating the self-light-emitting pointing element 70 or the non-light-emitting pointing element 80, and the projector 100 draws a line or geometric figure corresponding to a trajectory of the pointed position and projects the drawn image as the projection screen PS. In the whiteboard mode, the projector 100 may project an image including a menu bar as the projection screen PS. The menu bar includes, for example, a button for setting an attribute such as a type and shape of a geometric figure or a thickness and color of a line to be drawn by an operation of the self-light-emitting pointing element 70 or the non-light-emitting pointing element 80, or a button for giving an instruction to save a drawn geometric figure or image. In response to a button on the menu bar being designated by an operation of the self-light-emitting pointing element 70 or the non-light-emitting pointing element 80, the projector 100 performs processing such as drawing a geometric figure or saving image data.

The detection system 900 can also operate in other modes than the whiteboard mode. For example, the detection system 900 can execute an operation mode in which the projection screen PS is projected, based on image data inputted from an image source, not illustrated, such as a personal computer. In this operation mode, for example, the projector 100 projects an image of data of spreadsheet software or the like. In this operation mode, the projector 100 may perform input, preparation, correction or the like of data to be projected as the projection screen PS, based on an operation of the self-light-emitting pointing element 70 or the non-light-emitting pointing element 80.

Configuration of Projector and Self-Light-Emitting Pointing Element

Figure 4:
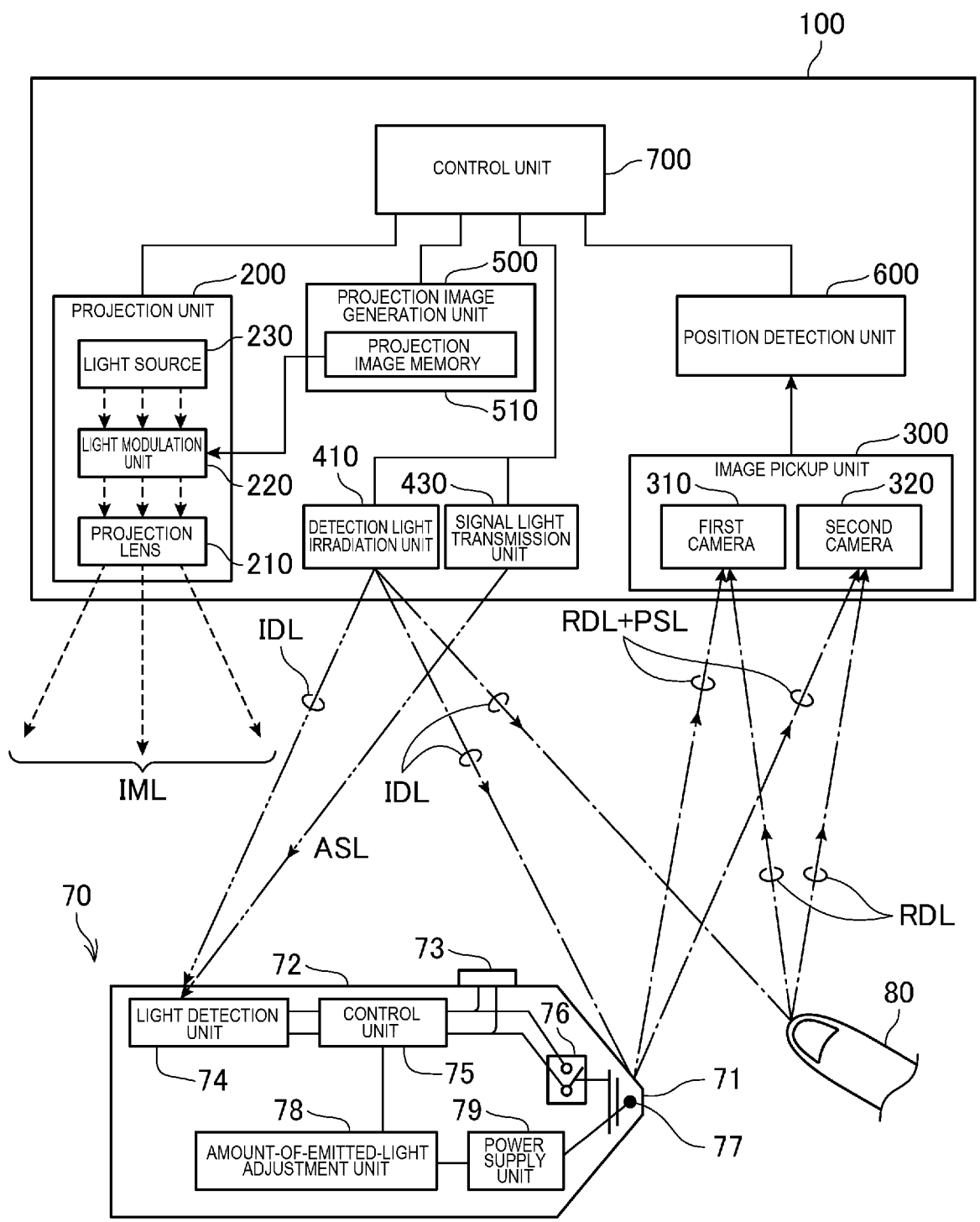
FIG. 4 is a block diagram of a projector and a pointing element forming the detection system.

FIG. 4 is a block diagram showing the internal configuration of the projector 100 and the self-light-emitting pointing element 70. The projector 100 has a control unit 700, a projection unit 200 (display unit), a projection image generation unit 500, a position detection unit 600 (detection unit), an image pickup unit 300, a detection light irradiation unit 410, and a signal light transmission unit 430.

The control unit 700 controls each part within the projector 100. The control unit 700 also carries out detection of the three-dimensional position of the self-light-emitting pointing element 70 and/or the non-light-emitting pointing element 80 detected by the position detection unit 600, and detection of contact with the screen SS. The control unit 700 determines the content of an instruction given by an operation of the self-light-emitting pointing element 70 and/or the non-light-emitting pointing element 80 and controls processing in which the projection image generation unit 500 prepares or changes a projection image, based on the instruction.

The projection image generation unit 500 has a projection image memory 510 which stores a projection image. The projection image memory 510 is a so-called frame memory which stores an image to be projected by the projection unit 200, on a frame basis.

The projection image generation unit 500 draws a projection image to be projected on the screen SS in the projection image memory 510, based on image data. The projection image generation unit 500 outputs an image signal representing the image in the projection image memory 510 to a light modulation unit 220 and causes the projection unit 200 to project the projection screen PS. The projection image generation unit 500 executes image processing on the image drawn in the projection image memory 510. For example, the projection image generation unit 500 executes geometric correction processing to correct a keystone distortion or the like of the projection screen PS, digital zoom processing to enlarge or reduce the projection screen PS, color correction processing to correct the color tone or the like of the projection screen PS, or the like.

The projection unit 200 projects the image processed by the projection image generation unit 500 onto the screen SS. The projection unit 200 has a projection lens 210, a light modulation unit 220, and a light source 230. The light modulation unit 220 modulates light from the light source 230 according to the image signal inputted from the projection image memory 510 and thus forms projection image light IML. The projection image light IML is typically color image light including visible light of the three colors of RGB and is projected onto the screen SS by the projection lens 210. As the light source 230, various light sources can be employed such as a lamp like an ultra-high-pressure mercury lamp, a solid-state light source like a LED (light-emitting diode) or laser diode, or other light sources. As the light modulation unit 220, a transmission-type or reflection-type liquid crystal panel, digital mirror device or the like can be employed. A plurality of light modulation units 220 corresponding to the individual color light components may be provided.

The detection light irradiation unit 410 casts irradiation detection light IDL for detecting a distal end part of the pointing element 780, into a direction including the screen SS. As the irradiation detection light IDL, for example, near-infrared light is used. The detection light irradiation unit 410 is, for example, a device having a detection light source such as a LED and an optical element which diffuses the detection light emitted from the detection light source along the screen surface (the surface of the screen board 920) and thus casts the detection light as the irradiation detection light IDL toward the screen SS.

The signal light transmission unit 430 transmits device signal light ASL, which is a near-infrared signal for synchronization. The device signal light ASL is an optical signal which the self-light-emitting pointing element 70 can receive via a light detection unit 74, described later. The signal light transmission unit 430 periodically transmits the device signal light ASL while the projector 100 is started up.

The device signal light ASL is, for example, a control signal which designates to the self-light-emitting pointing element 70 a timing when a pointing element signal light PSL, which is near-infrared light with a predetermined light emission pattern, is transmitted from a distal end light emitting unit 77. The self-light-emitting pointing element 70 transmits the pointing element signal light PSL, for example, synchronously with the timing when the device signal light ASL is received. The cameras 310, 320 of the image pickup unit 300 execute image pickup at a predetermined timing synchronized with the device signal light ASL, when detecting the position of the pointing element 780. Therefore, the projector 100 can perform image pickup via the image pickup unit 300 in accordance with the timing when the self-light-emitting pointing element 70 emits the pointing element signal light PSL.

The image pickup unit 300 has the first camera 310 and the second camera 320. The cameras 310, 320 have a light receiving element such as a CMOS image sensor, and receive light in a wavelength range including the wavelength of the detection light and thus pick up an image. As shown in FIG. 4, the cameras 310, 320 receive the pointing element signal light PSL emitted from the self-light-emitting pointing element 70 and reflected detection light RDL, which is the reflected light of the irradiation detection light IDL emitted from the detection light irradiation unit 410 and reflected off the self-light-emitting pointing element 70 or the non-light-emitting pointing element 80, and thus pick up an image. Thus, the pointing element signal light PSL and the reflected detection light RDL can be detected from the picked-up images picked up by the cameras 310, 320.

The position detection unit 600 detects the pointing element signal light PSL and the reflected detection light RDL from the picked-up images picked up by the cameras 310, 320, specifies the position of the image of the detected light in the picked-up images, and thus detects the position of the self-light-emitting pointing element 70 and the non-light-emitting pointing element 80.

The cameras 310, 320 execute image pickup, for example, both in a first period when the irradiation detection light IDL is cast from the detection light irradiation unit 410 and in a second period when the irradiation detection light IDL is not cast from the detection light irradiation unit 410. The position detection unit 600 compares the images picked up in these two kinds of periods and thus can determine whether each pointing element included in the images is the self-light-emitting pointing element 70 or the non-light-emitting pointing element 80.

It is preferable that at least one of the cameras 310, 320 has a function of picking up an image using light including visible light, in addition to the function of picking up an image using light including near-infrared light. Thus, the camera picks up an image of the projection screen PS projected on the screen SS, and the projection image generation unit 500 can execute keystone correction using this image. The method of keystone correction using one or more cameras is already known and therefore not described further in detail here.

The position detection unit 600 analyzes, for example, the picked-up images picked up by the cameras 310, 320 and calculates the three-dimensional position coordinates of the distal end part of the pointing element 780, using triangulation. The position detection unit 600 compares the picked-up images picked up in the first period and the second period and thus determines whether each pointing element 780 included in the images is the self-light-emitting pointing element 70 or the non-light-emitting pointing element 80. The position detection unit 600 also detects contact of the pointing element 780 with the projection screen PS (screen SS), based on the calculated three-dimensional position (coordinates) of the distal end part of the pointing element 780 or the light emission pattern of the self-light-emitting pointing element 70.

The self-light-emitting pointing element 70 has a light detection unit 74, a control unit 75, a distal end switch 76, a distal end light emitting unit 77, an amount-of-emitted-light adjustment unit 78, and a power supply unit 79, in addition to the distal end part 71, the shaft part 72, and the button switch 73 described above.

The control unit 75 controls each part of the self-light-emitting pointing element 70 and executes an operation corresponding to the reception of the device signal light ASL and an operation corresponding to the operation of the self-light-emitting pointing element 70.

The light detection unit 74 receives the device signal light ASL transmitted from the signal light transmission unit 430. The light detection unit 74 outputs a control signal indicating the timing when the device signal light ASL is received, and data obtained by decoding the device signal light ASL, or the like, to the control unit 75.

The distal end switch 76 is a switch which turns on when the distal end part 71 of the self-light-emitting pointing element 70 is pressed and which turns off when the distal end part 71 is released. The distal end switch 76 is normally off. When the distal end part 71 comes into contact with the screen SS, the distal end switch 76 turns on due to the contact pressure. The control unit 75 transmits different pointing element signal lights PSL between the state where the distal end switch 76 is on and the state where the distal end switch 76 is off. Specifically, when the distal end switch 76 is off, the control unit 75 causes the distal end light emitting unit 77 to emit light in a specific first light emission pattern indicating that the distal end switch 76 is off, and sends the pointing element signal light PSL having the first light emission pattern. Meanwhile, when the distal end switch 76 is on, the control unit 75 causes the distal end light emitting unit 77 to emit light in a specific second light emission pattern indicating that the distal end switch 76 is on, and sends the pointing element signal light PSL having the second light emission pattern. The first light emission pattern and the second light emission pattern are different from each other. Therefore, the projector 100 can identify whether the distal end switch 76 is on or off, by causing the position detection unit 600 to analyze the picked-up images from the cameras 310, 320.

The button switch 73 has the same function as the distal end switch 76. In the state where the button switch 73 is pressed by the user, the control unit 75 causes the distal end light emitting unit 77 to emit light in the second light emission pattern. In the state where the button switch 73 is not pressed, the control unit 75 causes the distal end light emitting unit 77 to emit light in the first light emission pattern. That is, the control unit 75 causes the distal end light emitting unit 77 to emit light in the second light emission pattern, in the state where at least one of the distal end switch 76 and the button switch 73 is on. The control unit 75 causes the distal end light emitting unit 77 to emit light in the first light emission pattern, in the state where both the distal end switch 76 and the button switch 73 are off. The button switch 73 may be assigned a different function from the distal end switch 76.

The power supply unit 79 has a battery such as a primary battery, secondary battery, or photovoltaic battery, as a power supply, and supplies electric power to each component of the self-light-emitting pointing element 70. The self-light-emitting pointing element 70 may have a power switch which turns on/off the supply of electric power from the power supply unit 79. The power supply unit 79 is controlled by the amount-of-emitted-light adjustment unit 78 and adjusts the current supplied to the distal end light emitting unit 77. The primary battery is replaceable. The secondary battery is replaceable or rechargeable.

Figure 5:
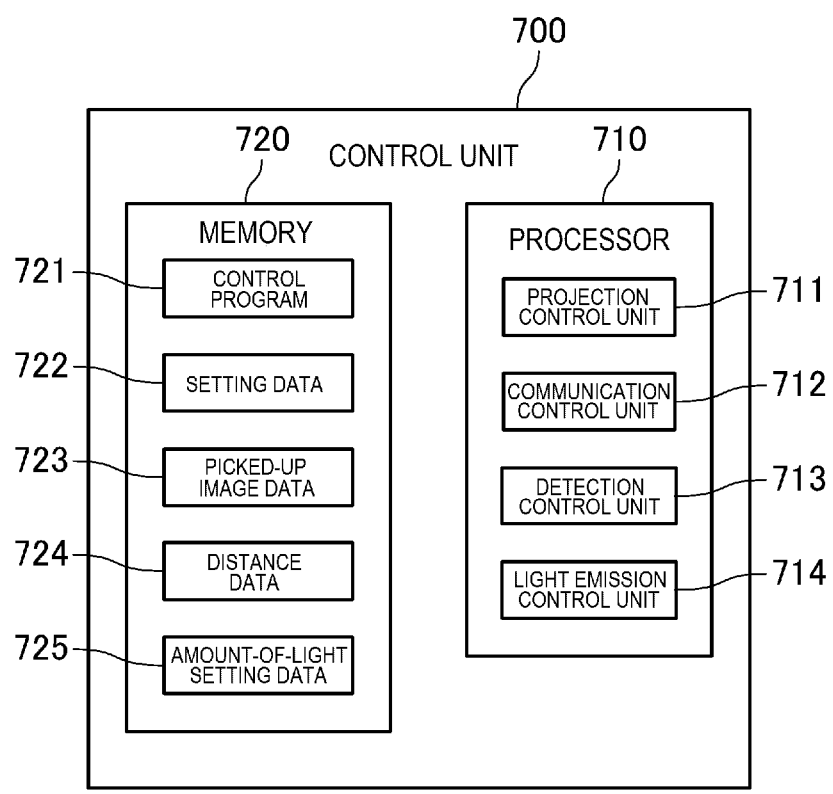
FIG. 5 is a functional block diagram of a control unit of the projector.

FIG. 5 is a functional block diagram of the control unit 700 of the projector 100.

The control unit 700 has a processor 710 and a memory 720. The memory 720 is a storage device which stores a control program executed by the processor 710 and data in a non-volatile manner. The memory 720 is made up of a semiconductor memory element or the like, such as a flash ROM. The memory 720 may include a RAM which forms a work area for the processor 710.

The processor 710 is made up of a CPU (central processing unit), microcomputer, or other arithmetic processing devices. The processor 710 executes a control program 721 stored in the memory 720 and thus functions as a projection control unit 711, a communication control unit 712, a detection control unit 713, and a light emission control unit 714. That is, these functional blocks are implemented by a collaboration of software and hardware as the processor 710 executes the control program 721.

The memory 720 also stores setting data 722, picked-up image data 723, distance data 724, and amount-of-light setting data 725 in addition to the control program 721.

The setting data 722 includes a set value for operations of the projector 100. The set value included in the setting data 722 is, for example, a setting about image processing executed by the projection image generation unit 500, a parameter used by the projection image generation unit 500 for image processing, and the like.

The picked-up image data 723 is picked-up image data outputted from the cameras 310, 320. The image pickup unit 300 outputs picked-up image data to the control unit 700 every time the cameras 310, 320 perform image pickup. The control unit 700 temporarily stores the picked-up image data in the memory 720 in order to perform processing to analyze the picked-up image data.

The distance data 724 is data used in processing in which the light emission control unit 714 calculates a distance to an end part of the projection screen PS, as described later. The distance data 724 includes information (distance information) representing a known distance with respect to each part of the projector 100.

The amount-of-light setting data 725 is data for setting an amount of light emitted from the distal end light emitting unit 77, in accordance with to the distance calculated with the distance data 724. For example, the amount-of-light setting data 725 includes a table, data, arithmetic expression, function, program or the like that establishes a correspondence between distances from the cameras 310, 320 and a necessary amount of light of the distal end light emitting unit 77.

The projection control unit 711 (display control unit) controls the projection image generation unit 500 and the projection unit 200 and causes the projection unit 200 to project an image drawn by the projection image generation unit 500, as the projection screen PS.

The communication control unit 712 controls the signal light transmission unit 430 to transmit a control signal to the self-light-emitting pointing element 70. The communication control unit 712 also analyzes the picked-up image data 723 and thus analyzes an infrared signal emitted from the self-light-emitting pointing element 70. For example, the control unit 75 may encode control data to include the timing when the distal end light emitting unit 77 emits light, and then transmit the pointing element signal light PSL. In this case, the communication control unit 712 specifies and decodes the timing when the image of the pointing element signal light PSL appears in the picked-up image data 723, and thus can receive the control data transmitted on the pointing element signal light PSL from the self-light-emitting pointing element 70.

The detection control unit 713 controls the position detection unit 600 to detect the position of the self-light-emitting pointing element 70 and the non-light-emitting pointing element 80. The detection control unit 713 also executes calibration for position detection.

The light emission control unit 714 finds an amount of light of the distal end light emitting unit 77 that is necessary for the cameras 310, 320 to detect the pointing element signal light PSL, and set the amount of light of the distal end light emitting unit 77. In this processing, the light emission control unit 714 performs various operations such as detecting a distance from a corner of the projection screen PS where the self-light-emitting pointing element 70 is used to the cameras 310, 320, calculating an amount of light of the distal end light emitting unit 77 corresponding to the detected distance, and setting the amount of light of the distal end light emitting unit 77.

Position Detection by Projector

The processing in which the projector 100 detects the position of the self-light-emitting pointing element 70 and the non-light-emitting pointing element 80 will now be described.

As shown in FIG. 4, the signal light transmitted and received in the detection system 900 includes the following five:

(1) the projection image light IML, which is image light projected onto the screen SS by the projection lens 210 in order to project the projection screen PS onto the screen SS, and is visible light in order to form an image visible to the user;

(2) the irradiation detection light IDL, which is near-infrared light cast from the detection light irradiation unit 410 in order to detect the self-light-emitting pointing element 70 and the non-light-emitting pointing element 80;

(3) the reflected detection light RDL, which is the reflected light of the irradiation detection light IDL reflected off the self-light-emitting pointing element 70 and the non-light-emitting pointing element 80 and is near-infrared light, similarly to the irradiation detection light IDL;

(4) the device signal light ASL, which is near-infrared light emitted from the signal light transmission unit 430 of the projector 100 in order to synchronize the projector 100 with the self-light-emitting pointing element 70; and (5) the pointing element signal light PSL, which is near-infrared light emitted from the distal end light emitting unit 77 of the self-light-emitting pointing element 70.

The projector 100 detects the position of the non-light-emitting pointing element 80, using the reflected detection light RDL. The projector 100 also detects the position of the self-light-emitting pointing element 70, using the pointing element signal light PSL. However, the projector 100 may detect the position of the self-light-emitting pointing element 70, using the reflected detection light RDL.

The first camera 310 and the second camera 320 are located at positions offset from the projection screen PS. That is, as shown in FIG. 2, the first camera 310 and the second camera 320 are offset in the X-direction from the center of the projection screen PS by an amount of offset equal to a distance D11. The distance D11 is the amount of offset of the first camera 310 and the second camera 320 from the projection lens 210 projecting the projection screen PS. The first camera 310 and the second camera 320 are arranged at different positions from each other with respect to the screen SS. As shown in FIG. 3, the first camera 310 and the second camera 320 are offset in the Z-direction by an amount of offset equal to a distance D12. The distances D11, D12 are decided by the structure of the projector 100 and are known regardless of the installation state of the projector 100. The projector 100 stores the distance data 724 including data representing the distances D11, D12.

The detection control unit 713 controls the position detection unit 600 to detect the image of the pointing element signal light PSL from each of the picked-up image picked up by the first camera 310 and the picked-up image picked by the second camera 320. Since the positions of the first camera 310 and the second camera 320 are offset from the screen SS as described above, the position of the image of the pointing element signal light PSL in the picked-up image is different between the first camera 310 and the second camera 320.

The detection control unit 713 executes arithmetic processing of triangulation, based on the difference in the position of the image of the pointing element signal light PSL between the picked-up images and the distance data 724, and thus can specify the position of the self-light-emitting pointing element 70. Similarly, the detection control unit 713 detects the position of the image of the reflected detection light RDL in each of the picked-up images picked up by the cameras 310, 320. The detection control unit 713 executes arithmetic processing of triangulation, based on the difference between the positions of the detected images and the distance data 724, and thus can specify the position of the non-light-emitting pointing element 80. In these processes, the position detection unit 600 may execute the arithmetic processing of triangulation under the control of the detection control unit 713. Also, the position detection unit 600 may execute the detection of the position of the image of the pointing element signal light PSL and/or the reflected detection light RDL in the picked-up image data 723, whereas the detection control unit 713 may execute the arithmetic processing of triangulation.

The detection control unit 713 may execute the position detection based on triangulation, as calibration. That is, by finding the position of the self-light-emitting pointing element 70 by triangulation based on the position of the image of the pointing element signal light PSL in the picked-up image, it is possible to establish a correspondence between the position of the image in the picked-up image by the first camera 310 or the second camera 320 and the position of the self-light-emitting pointing element 70 on the screen SS. After that, if the position of the image of the pointing element signal light PSL in the picked-up image by the first camera 310 or the second camera 320 is specified, the position of the self-light-emitting pointing element 70 can be specified, without performing the processing of triangulation. The same applies to the non-light-emitting pointing element 80.

In the embodiment below, an example where the first camera 310, of the cameras 310, 320, is used as a camera for position detection is described as an example. In this case, the first camera 310 is equivalent to a light receiving unit and an image pickup unit. In this example, the detection control unit 713 generates calibration data which establishes a correspondence between the position of the image of the pointing element signal light PSL in the picked-up image by the first camera 310 and the position of the self-light-emitting pointing element 70 on the screen SS, as calibration processing. The detection control unit 713 also generates calibration data which establishes a correspondence between the position of the image of the reflected detection light RDL in the picked-up image by the first camera 310 and the position of the non-light-emitting pointing element 80 on the screen SS. These calibration data are stored as the setting data 722 in the memory 720.

Subsequently, the detection control unit 713 detects the position of the self-light-emitting pointing element 70 and the non-light-emitting pointing element 80 from the picked-up image by the first camera 310, based on the calibration data of the setting data 722.

When the projector 100 detects the position of the self-light-emitting pointing element 70 based on the pointing element signal light PSL, the distal end light emitting unit 77 may emit an amount of light that is enough to detect the image of the pointing element signal light PSL in the picked-up image by the first camera 310. The image of the pointing element signal light PSL in the picked-up image becomes sharper as the self-light-emitting pointing element 70 gets closer to the first camera 310. Therefore, if the self-light-emitting pointing element 70 is close to the first camera 310, restraining the amount of light of the distal end light emitting unit 77 does not hinder the position detection.

The self-light-emitting pointing element 70 is used in an area where the projector 100 projects the projection screen PS, on the screen SS. Therefore, if the projection screen PS is small or if the projection screen PS is close to the first camera 310, the amount of light of the distal end light emitting unit 77 can be restrained. Restraining the amount of light of the distal end light emitting unit 77 can restrain the amount of electric power consumed by the self-light-emitting pointing element 70. This can reduce the frequency of replacing or recharging the battery of the power supply unit 79 and improve convenience.

Thus, the projector 100 finds the distance to the most distant position from the first camera 310 in the projection screen PS, which is the range where the self-light-emitting pointing element 70 is used, and sets an amount of light of the distal end light emitting unit 77 corresponding to the found distance.

The most distant position from the first camera 310 in the projection screen PS is one of the four corners of the projection screen PS. FIG. 2 shows the corners of the projection screen PS as C1, C2, C3, and C4. As described above, the first camera 310 is offset from the center of the projection screen PS toward the corners C1, C2 in the X-direction as shown in FIG. 2. Therefore, the most distant corner from the first camera 310 in the projection screen PS is the corner C3.

Operation of Projector

Figure 6:
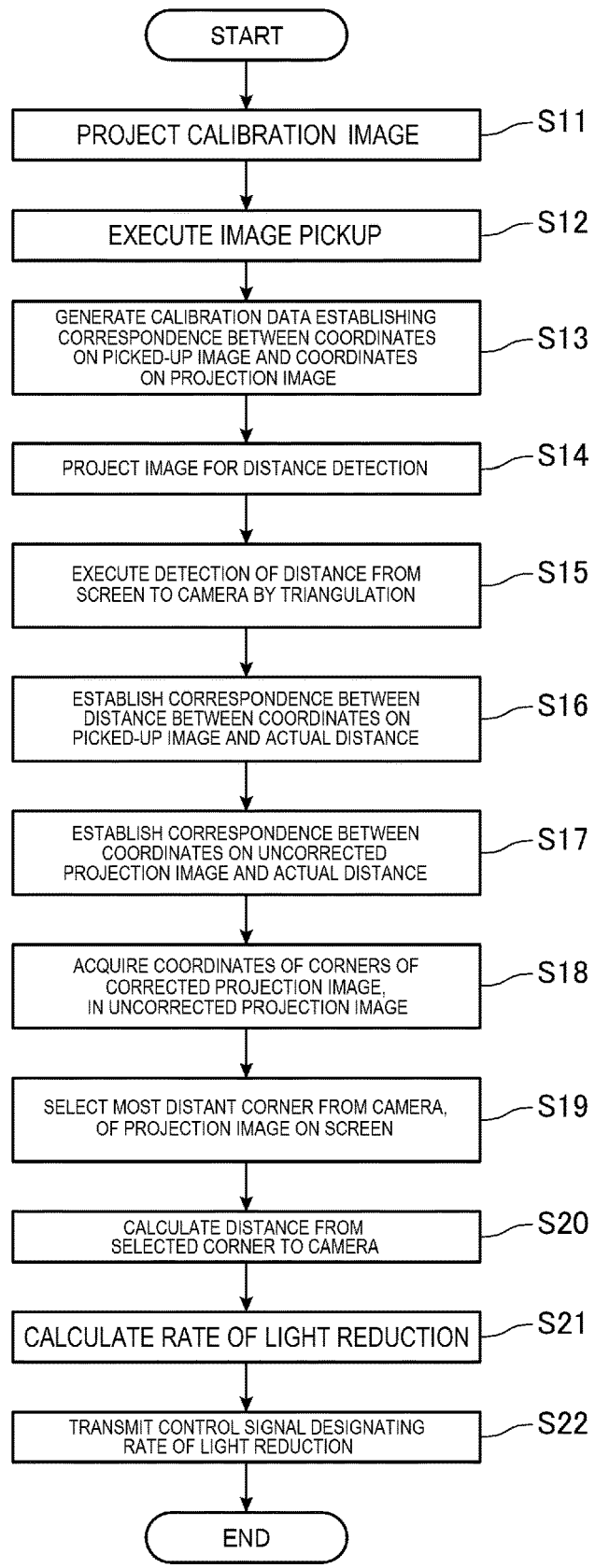
FIG. 6 is a flowchart showing operations of the projector.
Figure 7:
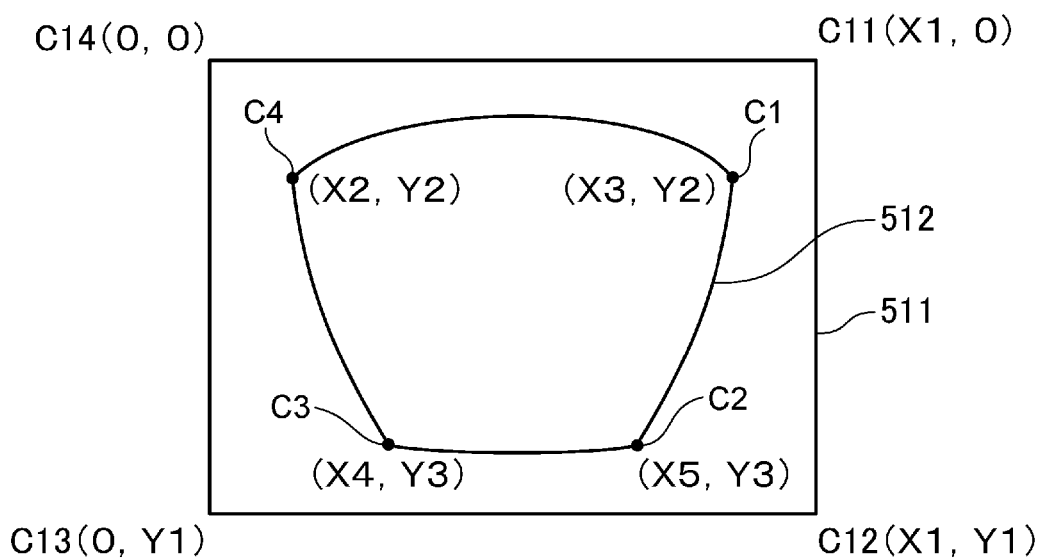
FIG. 7 is an explanatory view showing operations of the projector.

FIG. 6 is a flowchart showing an operation of the projector 100. FIG. 7 is an explanatory view of an operation of the projector 100.

FIG. 6 shows an operation of the projector 100 including a step where the control unit 700 performs calibration.

The detection control unit 713 causes the projection unit 200 to project a calibration image stored in advance in the memory 720 onto the screen SS (step S11). The range where the calibration image is projected includes at least the range where the projection screen PS is projected, and preferably the same range as the projection screen PS.

The detection control unit 713 causes the first camera 310 to execute image pickup, acquires picked-up image data, and causes the picked-up image data to be stored as the picked-up image data 723 (step S12).

The detection control unit 713 analyzes the picked-up image by the first camera 310 and thus generates calibration data which establishes a correspondence between a position in the picked-up image by the first camera 310 and a position in the projection screen PS (step S13). The detection control unit 713 causes the memory 720 to store the calibration data generated in step S13, as the setting data 722. The calibration data is data which establishes a correspondence between coordinates in the picked-up image by the first camera 310 and coordinates in the projection screen PS. The coordinates in the projection screen PS refer to coordinates in an image stored in the projection image memory 510. By using the calibration data, it is possible to specify coordinates in the projection screen PS overlapping an image of the reflected detection light RDL or the pointing element signal light PSL when this image is detected in the picked-up image by the first camera 310.

The calibration in steps S11 to S13 may be carried out once when the projector 100 is installed in the detection system 900, that is, when the projector 100 is fixed with respect to the screen SS. Therefore, if the setting data 722 includes calibration data, the processor 710 may only perform the processing of step S14 onward.

The light emission control unit 714 causes the projection unit 200 to project an image for distance detection (step S14). The image for distance detection is an image based on image data stored in advance in the memory 720 and is projected in a range including the projection screen PS. For example, the image for calibration projected in step S11 can be used.

The light emission control unit 714 executes triangulation using the picked-up image by the first camera 310 and detects the distance from the screen SS to the first camera 310 (step S15). In step S15, the light emission control unit 714 acquires the picked-up image by the first camera 310, causes the memory 720 to store the picked-up image as the picked-up image data 723, and analyzes this picked-up image data 723. The distance found in step S15 is the distance D21, the distance D22, and the distance D23 shown in FIG. 3. The distance D21 is the distance in the Z-direction from the first camera 310 to the screen SS. The distance D22 is the distance in the Y-direction from the first camera 310 to the screen SS. The distance D23 is the distance from the first camera 310 to a lower end, which is an end part of the projection screen PS. The distance D23 is decided by the positions in the Y-direction of the corners C2, C3.

In FIG. 3, the distance D21 is found in step S13. The distance D22 is already known. The distance D23 is found in step S13. The distance D22 can be found in step S13.

The light emission control unit 714 establishes a correspondence between a distance in the picked-up image by the first camera 310 and an actual distance on the screen SS, based on the distances D21, D22, D23 (step S16). The distance in the picked-up image by the first camera 310 is equivalent to the distance between coordinates expressed on a coordinate system which is set on the picked-up image. The processing of step S16 enables conversion of the distance between two points on the picked-up image by the first camera 310 into the actual distance.

The light emission control unit 714 establishes a correspondence between a distance in the uncorrected projection screen PS and the actual distance on the screen SS, based on the calibration data stored in step S13, with respect to the distances whose correspondence is established in step S16 (step S17).

FIG. 7 shows a geometrically uncorrected projection image 511 and a geometrically corrected projection image 512, stored in the projection image memory 510. The projection image 511 is a rectangular image with four corners having coordinates C11 (X1, 0), C12 (X1, Y1), C13 (0, Y1), C14 (0, 0) on a coordinate system whose origin is at the corner C14 and which is set in the projection image memory 510. The projection image 512 is an image generated by the projection image generation unit 500 deforming the projection image 511 in such a way as to compensate for the keystone distortion of the projection screen PS on the screen SS. The four corners C11, C12, C13, C14 of the projection image 511 are moved into the corners of C1, C2, C3, C4 of the projection image 512 by geometric correction.

In step S17, the light emission control unit 714 establishes a correspondence between a distance in the projection image 511 and an actual distance. The light emission control unit 714 also acquires coordinates of the corners of the geometrically corrected projection image 512, in the projection image 511 (step S18). That is, in step S18, the light emission control unit 714 acquires the coordinates C1 (X3, Y2), C2 (X5, Y3), C3 (X4, Y3), C4 (X2, Y2) of the corners C1 to C4, on the coordinate system whose origin is at the corner C14 and which is set in the projection image memory 510.

Next, the light emission control unit 714 selects the most distant corner from the first camera 310, of the projection screen PS projected on the screen SS (step S19). In the example of this embodiment, the corner C3 is selected. The light emission control unit 714 may execute the selection in step S19, for example, based on the calibration image projected in step S11 or the image projected in step S14. Also, in step S19, the user may operate the self-light-emitting pointing element 70 or the non-light-emitting pointing element 80 to designate the corner to be selected.

The light emission control unit 714 calculates the actual distance from the first camera 310 to the corner C3, that is, the distance D1 shown in FIGS. 2 and 3, based on the coordinates (X4, Y3) of the corner C3 acquired in step S18 and the distances whose correspondence is established in step S17 (step S20).

The light emission control unit 714 calculates a rate of light reduction for the amount of light of the distal end light emitting unit 77 that corresponds to the distance D1 calculated in step S20 (step S21). The rate of light reduction calculated in step S21 is a value expressing the amount of light with which the first camera 310 can detect the self-light-emitting pointing element 70, as a ratio to a maximum value of the amount of light emitted from the distal end light emitting unit 77. A proper amount of light of the distal end light emitting unit 77 to restrain the amount of electric power consumed by the distal end light emitting unit 77 is found, and the amount of light thus found is expressed by the rate of light reduction for the distal end light emitting unit 77.

The light emission control unit 714 causes the signal light transmission unit 430 (transmission unit) to transmit the device signal light ASL for setting the rate of light reduction found in step S21 onto the self-light-emitting pointing element 70.

The light detection unit 74 of the self-light-emitting pointing element 70 receives the device signal light ASL, analyzes the light reception timing and change in the amount of light of the device signal light ASL, thus generates data laid on the device signal light ASL, and outputs the data to the control unit 75. Also, the control unit 75 may analyze the light reception state of the device signal light ASL by the light detection unit 74 and generate data laid on the device signal light ASL. The control unit 75 controls the amount-of-emitted-light adjustment unit 78, based on the received data.

The amount-of-emitted-light adjustment unit 78 of the self-light-emitting pointing element 70 adjusts the light emission intensity of the distal end light emitting unit 77, based on the rate of light reduction represented by the data generated on the basis of the device signal light ASL by the control unit 75. Specifically, the amount-of-emitted-light adjustment unit 78, under the control of the control unit 75, adjusts the amount of current supplied to the distal end light emitting unit 77. The distal end light emitting unit 77 has a light emission intensity rising (increasing) in proportion to the current supplied to the distal end light emitting unit 77 from the power supply unit 79. Therefore, the rate of light reduction of the distal end light emitting unit 77 increases as the amount-of-emitted-light adjustment unit 78 reduces the current supplied to the distal end light emitting unit 77. Meanwhile, the rate of light reduction of the distal end light emitting unit 77 decreases as the power supply unit 79 increases the current supplied to the distal end light emitting unit 77. Thus, in the self-light-emitting pointing element 70, the amount of light of the distal end light emitting unit 77 is set according to the rate of light reduction calculated by the light emission control unit 714 in step S21.

The light reception intensity of the pointing element signal light PSL received by the first camera 310 is inversely proportional to the square of the distance between the light receiving unit and the light emitting unit. Therefore, by setting the rate of light reduction of the distal end light emitting unit 77 corresponding to the distance D1 found in step S20 by the light emission control unit 714, it is possible to reduce the amount of electric power consumed by the distal end light emitting unit 77 and extend the battery life without hindering position detection.

As described above, the projector 100 in the embodiment has the first camera 310, which receives the light emitted from the self-light-emitting pointing element 70, and the position detection unit 600, which detects an operation of the self-light-emitting pointing element 70 to the detection area, based on the light reception state of the first camera 310. The projector 100 has the light emission control unit 714, which calculates a light emission intensity of the self-light-emitting pointing element 70 which is suitable for the detection by the position detection unit 600, based on the distance from an end part of the projection screen PS, which is the detection area, to the first camera 310. The light emission control unit 714 calculates the light emission intensity, for example, as the rate of light reduction.

In the projector 100, to which the detection device and the method for controlling the detection device according to the invention are applied, the light emission intensity of the light emitted from the self-light-emitting pointing element 70 is calculated, based on the distance from an end part of the projection screen PS, which is the detection area, to the first camera 310 of the detection device. Therefore, a necessary light emission intensity to receive and detect the light emitted from the self-light-emitting pointing element 70 can be accurately calculated. Thus, the light emission intensity of the self-light-emitting pointing element 70 can be properly adjusted, based on a condition closer to the actual detection.

In the detection system 900, the projector 100, which is the device on the side receiving the pointing element signal light PSL, calculates the light emission intensity of the self-light-emitting pointing element 70 emitting the pointing element signal light PSL. Since the intensity of the pointing element signal light PSL is found via the control of the device on the side receiving the pointing element signal light PSL, a light emission intensity suitable for the actual detection can be found. This is advantageous in that the light emission intensity can be adjusted under a condition closer to the actual detection. Also, the adjustment of the light emission intensity does not increase the load of arithmetic processing by the self-light-emitting pointing element 70 and is therefore advantageous in that the configuration of the self-light-emitting pointing element 70 does not have to be complicated or increased in size.

The projector 100 has the projection unit 200 as a display unit which displays an image on the screen SS. The first camera 310 is an image pickup unit which picks up an image over a range including the detection area which is set on the screen SS. The position detection unit 600 detects an operation of the self-light-emitting pointing element 70 to the projection screen PS, based on the picked-up image by the first camera 310. Thus, a proper light emission intensity of the self-light-emitting pointing element 70 can be found in the case of detecting the light emitted from the self-light-emitting pointing element 70 in the detection area which is set on the screen SS.

When a position pointing operation using the self-light-emitting pointing element 70 is carried out on the projection screen PS, the position detection unit 600 detects a pointed position in the detection area, based on the picked-up image by the first camera 310. Thus, a proper light emission intensity of the self-light-emitting pointing element 70 can be found in the case of detecting a pointed position of the self-light-emitting pointing element 70 in the detection area, based on the picked-up image.

The projector 100 also has the projection control unit 711, which controls the projection unit 200. When the projection control unit 711 sets the projection screen PS as an image display area in a part of the screen SS and displays an image, the position detection unit 600 detects an operation of the self-light-emitting pointing element 70 to the image display area. Thus, a proper light emission intensity of the self-light-emitting pointing element 70 can be found, when the detection device displaying an image on the screen SS detects the light emitted from the self-light-emitting pointing element 70 in the detection area set on the screen SS.

The light emission control unit 714 calculates the light emission intensity of the self-light-emitting pointing element 70, based on the distance between the corner C3, which is the most distant position from the first camera 310 in the image display area, and the first camera 310. Thus, a light emission intensity of the self-light-emitting pointing element 70 which is necessary to detect the pointed position of the self-light-emitting pointing element 70 in the detection area, based on the picked-up image, can be accurately found.

The light emission control unit 714 also functions as a setting unit which sets a light emission intensity of the self-light-emitting pointing element 70 onto the self-light-emitting pointing element 70, based on the calculated light emission intensity of the self-light-emitting pointing element 70. Thus, the light emission intensity of the self-light-emitting pointing element 70 can be set to a proper intensity in the case of receiving and detecting the light from the self-light-emitting pointing element 70.

The projector 100 also has the signal light transmission unit 430 as a transmission unit which transmits a signal to the self-light-emitting pointing element 70. The light emission control unit 714 causes the signal light transmission unit 430 to transmit the device signal light ASL including control information for setting a light emission intensity of the self-light-emitting pointing element 70, to the self-light-emitting pointing element 70. Thus, the light emission intensity of the self-light-emitting pointing element 70 can be set to a proper intensity by transmitting the control information to the self-light-emitting pointing element 70.

Other Embodiments

The embodiment is simply a specific example to which the invention is applied. The invention is not limited to this embodiment.

While the embodiment is configured in such away that the light emission control unit 714 finds the rate of light reduction of the pointing element signal light PSL emitted from the distal end light emitting unit 77, the light emission control unit 714 may calculate the light emission intensity of the distal end light emitting unit 77. In this case, the light emission control unit 714 causes the signal light transmission unit 430 to transmit the device signal light ASL including control information for designating the light emission intensity. The control unit 75 may control the amount-of-emitted-light adjustment unit 78 to adjust the light emission intensity of the distal end light emitting unit 77, based on the information included in the device signal light ASL.

In the embodiment, the light emission control unit 714 may find the light emission intensity or the rate of light reduction of the irradiation detection light IDL emitted from the detection light irradiation unit 410, based on the distance D1. In this case, the light emission control unit 714 may set the light emission intensity or the rate of light reduction of the detection light irradiation unit 410. In this configuration, the light emission intensity of the distal end light emitting unit 77 and the light emission intensity of the detection light irradiation unit 410 are set, based on the distance D1 calculated in the same processing. In this case, in the case of detecting the position of the self-light-emitting pointing element 70 and the non-light-emitting pointing element 80, based on the picked-up image by the first camera 310, the difference between the brightness of the image of the reflected detection light RDL and the brightness of the image of the pointing element signal light PSL in the picked-up image can be reduced. This is advantageous in that the position detection unit 600 can accurately detect both the image of the reflected detection light RDL and the image of the pointing element signal light PSL from the picked-up image and thus can perform position detection.

In the projector 100, the image pickup unit 300 may have one camera or may have three or more cameras. If the image pickup unit 300 has one camera, the two-dimensional coordinates (X, Y) of the self-light-emitting pointing element 70 are decided, based on one image picked up by the camera. To detect the position of the non-light-emitting pointing element 80, a configuration to form light in the form of a layer along the screen SS may be provided. Meanwhile, if the image pickup unit 300 has three or more cameras, three-dimensional coordinates (X, Y, Z) are decided, based on m images picked up by m cameras (m being an integer equal to or greater than 3). For example, three-dimensional coordinates may be found each time using mC2 combinations of two images arbitrarily selected from the m images, and the final three-dimensional coordinates may be decided using the average value of these three-dimensional coordinates. This can further increase the accuracy of detecting the three-dimensional coordinates.

While the projector 100 configured to be able to use both the self-light-emitting pointing element 70 and the non-light-emitting pointing element 80 is described as an example in the embodiment, the projector may be able to use at least one self-light-emitting pointing element 70.

In the embodiment, it is assumed that all of the irradiation detection light IDL, the reflected detection light RDL, the device signal light ASL, and the pointing element signal light PSL shown in FIG. 2 are near-infrared light. However, a part or all of these lights may be other than near-infrared light.

The display device according to the invention is not limited to the projector 100. A liquid crystal monitor or liquid crystal television which displays an image on a liquid crystal display panel may be employed as the display device. A display device having a plasma display panel, an OLED (organic light-emitting diode), or an organic EL display panel such as an OEL (organic electroluminescence) display may be employed. In this case, the display panel is equivalent to the display surface of the invention.

Each functional unit shown in FIG. 5 represents a functional configuration and is not limited to any specific form of installation. That is, individual pieces of hardware corresponding to the respective functional unit need not necessarily be installed. A single processor can implement functions of a plurality of functional units by executing a program. A part of the functions implemented by software in the embodiment may be implemented by hardware, and a part of the functions implemented by hardware may be implemented by software. Also, specific details of each of the other parts forming the detection system 900 can be arbitrarily changed without departing from the spirit of the invention.

The entire disclosure of Japanese Patent Application No. 2018-059591, filed Mar. 27, 2018 is expressly incorporated by reference herein.

What is claimed is:
1. A detection device comprising:
 a camera that captures light emitted from a detection target device; and
 a processor programmed to:
  detect an operation of the detection target device within a detection area based on a light reception state of the light captured by the camera;
  calculate a light emission intensity of the detection target device based on distance information from an end part of the detection area to the camera; and
  change the light emission intensity of the detection target device based on at least the distance information from the end part of the detection area to the camera and the captured light emitted from the detection target device.
2. The detection device according to claim 1, further comprising:
 a projection lens which displays an image on a display surface, wherein the camera is configured to pick up an image over a range including the detection area that is set on the display surface, and the processor detects an operation of the detection target device to the detection area, based on a picked-up image by the camera.

3. The detection device according to claim 2, wherein when a position pointing operation using the detection target device is carried out in the detection area, the processor detects a pointed position in the detection area, based on the picked-up image by the camera.

4. The detection device according to claim 2, wherein:
the processor is further programmed to control the projection lens, and
when the processor sets an image display area in a part of the display surface and causes the image to be displayed, the processor detects an operation of the detection target device to the image display area.

5. The detection device according to claim 2, wherein the processor calculates the light emission intensity of the detection target device, based on a distance between a most distant position from the camera in the image display area and the camera.

6. The detection device according to claim 1, wherein the processor is further programmed to:
set a light emission intensity of the detection target device onto the detection target device, based on the calculated light emission intensity of the detection target device.

7. The detection device according to claim 6, wherein the processor is further programmed to:
transmit a signal to the detection target device, and
transmit control information for setting a light emission intensity of the detection target device, to the detection target device.

8. A method for controlling a detection device including a camera which receives light emitted from a detection target device, the method comprising:
detecting an operation of the detection target device within a detection area based on a light reception state of the light captured by the camera;
calculating a light emission intensity of the detection target device, based on distance information from an end part of the detection area to the camera; and
changing the light emission intensity of the detection target device based on at least the distance information from the end part of the detection area to the camera and the captured light emitted from the detection target device.

9. The method for controlling the detection device according to claim 8, further comprising:
displaying an image on a display surface,
picking up an image over a range including the detection area that is set on the display surface, and
detecting an operation of the detection target device to the detection area based on a picked-up image thus picked up.

10. The method for controlling the detection device according to claim 9, further comprising:
detecting a pointed position in the detection area based on the picked-up image when a position pointing operation using the detection target device is carried out in the detection area.

11. The method for controlling the detection device according to claim 9, further comprising:
setting an image display area in a part of the display surface,
displaying the image in the image display area, and
detecting an operation of the detection target device to the image display area.

12. The method for controlling the detection device according to claim 9, wherein
the light emission intensity of the detection target device is calculated based on a distance between a most distant position from the camera in the image display area and the camera.

13. The method for controlling the detection device according to claim 8, wherein
a light emission intensity of the detection target device is set in the detection target device based on the calculated light emission intensity of the detection target device.

14. The method for controlling the detection device according to claim 13, further comprising:
transmitting control information for setting a light emission intensity of the detection target device to the detection target device.

* * * * *